United States Patent
Yao et al.

(10) Patent No.: US 11,266,128 B2
(45) Date of Patent: Mar. 8, 2022

(54) CAMERA CONTROLLER FOR AQUACULTURE BEHAVIOR OBSERVATION

(71) Applicant: X Development LLC, Mountain View, CA (US)

(72) Inventors: Zhaoying Yao, Palo Alto, CA (US); Tatiana Kichkaylo, Mountain View, CA (US); Barnaby John James, Los Gatos, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/880,349

(22) Filed: May 21, 2020

(65) Prior Publication Data
US 2021/0360906 A1 Nov. 25, 2021

(51) Int. Cl.
*A01K 61/80* (2017.01)
*H04N 5/232* (2006.01)
*A01K 29/00* (2006.01)

(52) U.S. Cl.
CPC ............ *A01K 61/80* (2017.01); *A01K 29/005* (2013.01); *H04N 5/23218* (2018.08); *H04N 5/23299* (2018.08)

(58) Field of Classification Search
CPC .. A01K 61/80; A01K 29/005; H04N 5/23299; H04N 5/23218
See application file for complete search history.

(56) References Cited

U.S. PATENT DOCUMENTS

| | | | |
|---|---|---|---|
| 4,744,331 A | 5/1988 | Whiffin | |
| 5,823,140 A | 10/1998 | Pittet et al. | |
| 2010/0198023 A1 | 8/2010 | Yanai et al. | |
| 2015/0302241 A1 | 10/2015 | Eineren et al. | |
| 2018/0132459 A1* | 5/2018 | Baba | A01K 74/00 |
| 2020/0107524 A1 | 4/2020 | Messana et al. | |
| 2020/0113158 A1* | 4/2020 | Rishi | A01K 61/10 |

FOREIGN PATENT DOCUMENTS

| | | |
|---|---|---|
| CN | 110476860 | 11/2019 |
| WO | WO 2016/023071 | 2/2016 |

(Continued)

OTHER PUBLICATIONS

Malov et al., "A spatio-temporal recurrent network for salmon feeding action recognition from underwater videos in aquaculture," Computers and Electronics in Agriculture, Nov. 12, 2019, 9 pages.

(Continued)

*Primary Examiner* — Tat C Chio
(74) *Attorney, Agent, or Firm* — Fish & Richardson P.C.

(57) ABSTRACT

Methods, systems, and apparatus, including computer programs encoded on computer-storage media, for controlling a camera to observe aquaculture feeding behavior. In some implementations, a method includes moving a camera to a first position, obtaining an image captured by the camera at the first position, determining a feeding observation mode, and based on the feeding observation mode and analysis of the image, determining a second position to move the camera.

12 Claims, 6 Drawing Sheets

(56) References Cited

FOREIGN PATENT DOCUMENTS

| | | | |
|---|---|---|---|
| WO | WO 2019/212807 | 11/2019 | |
| WO | WO-2020046524 A1 * | 3/2020 | ............. A01K 61/80 |

OTHER PUBLICATIONS

Odey, "AquaMesh—Design and Implementation of Smart Wireless Mesh Sensor Networks for Aquaculture," American Journal of Networks and Communications, Jul. 2013, 8 pages.
Office Action in Canadian Appln. No. 3,087,370, dated Aug. 4, 2021, 3 pages.
PCT International Search Report and Written Opinion in International Appln. No. PCT/US2021/022702 , dated Jul. 9, 2021, 28 pages.
Petrov et al., "Overview of the application of computer vision technology in fish farming," E3S Web of Conferences, 2020, 175:02015.
Saberloon et al., "Application of Machine Vision Systems in Aquaculture with Emphasis on Fish: State-of-the-Art and Key Issues," Reviews in Aquaculture, Dec. 2017, 9:369-387.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquacuiture-7a273399553/>, 12 pages.
Wang, "Robust tracking of fish schools using CNN for head identification," Multimedia Tools and Applications, Nov. 2017, 20 pages.

* cited by examiner

CAMERA CONTROLLER FOR AQUACULTURE BEHAVIOR OBSERVATION

FIELD

This specification relates to an automated camera controller for aquaculture systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures.

A camera system controlled by a human operator can be used to monitor farmed fish as the fish move throughout their enclosure. When camera systems are manually controlled, human factors, such as the attention span or work schedule of the operator, or the comfort of the human operator in extreme weather conditions, can affect the quality of monitoring.

SUMMARY

In general, innovative aspects of the subject matter described in this specification relate to controlling a camera to observe aquaculture feeding behavior. Farming aquaculture livestock may require that the livestock be fed while the livestock grows. For example, salmon being farmed may be fed for three to seven hours a day until the salmon are large enough to be harvested.

Observing feeding behavior may rely on appropriately controlling a camera to observe feeding. For example, if a camera is too far from feeding livestock then no feeding behavior may be observed. In another example, if a camera is too close to feeding livestock, then no feeding behavior may be observed as a single livestock may take up an entire view of the camera. In yet another example, if the camera is too shallow or too deep compared to the depth that the fish are feeding, then no feeding behavior may be seen. Controlling a camera to observe feeding may rely on images of the livestock and feed to determine where the camera should be placed. For example, the camera may be controlled to find feeding livestock, and then positioned an appropriate distance from the feeding livestock to observe feeding behavior.

Feeding behavior of livestock may be observed to obtain useful information. For example, feeding behavior may indicate that livestock are not consuming a large majority of the feed being provided to the livestock so the amount of feed provided to the livestock may be reduced. In another example, feeding behavior may indicate that livestock are quickly consuming feed being provided to the livestock so the rate that feed is provided to the livestock may be increased. In yet another example, feeding behavior may indicate that livestock are unhealthy as they are not consuming as much feed as expected so medication may be provided to the livestock.

A system that provides automated control of a camera to observe aquaculture feeding behavior may provide more accurate determination of feeding behavior and may increase efficiency in feeding livestock. For example, the automated control may ensure that the camera is optimally positioned to capture images that show feeding behavior of fish. In another example, the automated control may allow a system to automatically increase a rate that feed is provided to fish while the fish are eating most of the feed, and automatically decrease or stop providing feed to fish when the fish are not eating most of the feed. Accordingly, the system may decrease an amount of waste of feed used in raising livestock by reducing an amount of unconsumed feed and increase yield by providing more feed for fish to consume.

One innovative aspect of the subject matter described in this specification is embodied in a method that includes moving a camera to a first position, obtaining an image captured by the camera at the first position, determining a feeding observation mode, and based on the feeding observation mode and analysis of the image, determining a second position to move the camera.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects determining a feeding observation mode includes determining that the feeding observation mode corresponds to a feeder localization mode, and determining a second position to move the camera includes determining from the image that fish are likely feeding in a particular direction from the first position and determining the second position based on the particular direction that the fish are likely feeding.

In certain aspects, determining from the image that fish are likely feeding in a particular direction from the first position includes determining from the image that at a location one or more of a density of fish satisfies a density criteria, a horizontal swimming speed of fish satisfies a speed criteria, a number of fish swimming vertical satisfies a vertical criteria, a number of mouths of fish opening satisfies a mouth criteria, or a number of feed satisfies a feed criteria, and determining the particular direction based on the location.

In some implementations, determining that the feeding observation mode corresponds to a feeder localization mode includes determining that a feeding process has started. In some aspects, determining a feeding observation mode includes determining that the feeding observation mode corresponds to patrol mode, and determining a second position to move the camera includes determining from the image that feed is sinking below the first position and determining the second position to be deeper than the first position.

In certain aspects, determining from the image that feed is sinking below the first position includes determining that feed is visible at a bottom of the image. In some implementations, determining a feeding observation mode includes determining that the feeding observation mode corresponds to patrol mode, and determining a second position to move the camera includes determining from the image that feed is not visible and determining the second position to be shallower than the first position.

In some aspects, determining a feeding observation mode includes determining that the feeding observation mode corresponds to patrol mode, and determining a second position to move the camera includes determining from the image that feed is visible but not sinking below the first position, increasing an amount of feed provided to fish, and determining the second position to be deeper than the first position.

In certain aspects, actions include obtaining a second image captured by the camera at the second position, determining the feed is sinking below the second position, and reducing the amount of feed provided to the fish. In some aspects, determining that the feeding observation mode corresponds to patrol mode includes determining that a feeder localization mode has completed.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
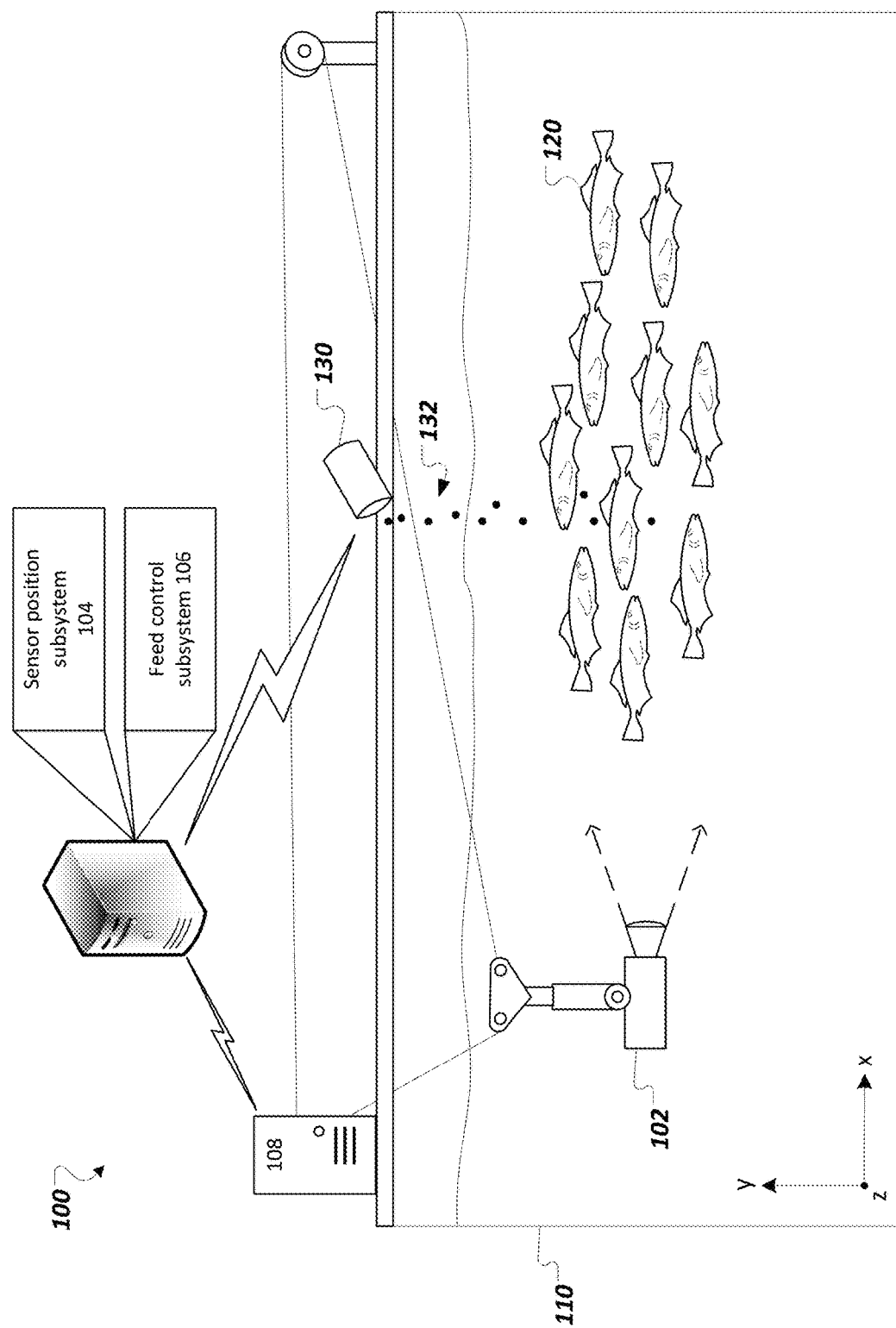
FIG. 1 is a diagram of an example feeding behavior monitoring system and an enclosure that contains aquatic livestock.

FIG. 1 is a diagram of an example feeding behavior monitoring system 100 and an enclosure 110 that contains aquatic livestock. A Cartesian coordinate system is provided for ease of reference. Although FIG. 1 shows the enclosure 110 extending in the xy-plane, the enclosure further extends in the z-direction, with the positive z-direction extending out of the page of the drawing.

The livestock can be aquatic creatures, such as livestock 120, which swim freely within the confines of the enclosure 110. In some implementations, the aquatic livestock 120 stored within the enclosure 110 can include finfish or other aquatic lifeforms. The livestock 120 can include for example, juvenile fish, koi fish, sharks, salmon, and bass, to name a few examples.

In addition to the aquatic livestock, the enclosure 110 contains water, e.g., seawater, freshwater, or rainwater, although the enclosure can contain any fluid that is capable of sustaining a habitable environment for the aquatic livestock. The feeding behavior monitoring system 100 includes a sensor subsystem 102, a sensor position subsystem 104, a feed control subsystem 106, a winch subsystem 108, and a feeder 130.

The feeding behavior monitoring system 100 can be used to monitor feeding behavior of aquatic livestock. For example, the system 100 may be used to determine, where, how much, and for long fish are feeding within the enclosure 110. Observing feeding behavior may be difficult as the sensor subsystem 102 may need to be positioned appropriately to observe feeding behavior. For example, if a sensor subsystem 102 is positioned too far from where fish are feeding, then no feeding behavior may be observed. In another example, if a sensor subsystem 102 is positioned too close to where fish are feeding, then a fish passing immediately next to the sensor subsystem 102 may block anything else from being sensed besides that fish. In general, a distance of six feet from feeding may be an optimal amount of distance to observe feeding. For example, six feet of distance from feeding may allow a camera to have a view of feed sinking while at the same time having a view of multiple fish eating the feed. The optimal distance may vary based on various conditions. For example, the optimal distance may be greater when the water is more clear or more sunlight is shining on feed.

The feeding behavior monitoring system 100 may control feeding based on the feeding behavior that is observed. For example, the system 100 may determine that the fish are no longer eating the feed and, in response, stop providing feed. In another example, the system 100 may determine that the fish are eating the feed but also a large portion of the feed is uneaten by the fish and, in response, reduce a rate that feed is being provided to the fish. In yet another example, the system 100 may determine that the fish are quickly eating all the feed and, in response, increase a rate that feed is being provided to the fish.

The sensor position subsystem 104 can store a current position of the sensor subsystem 102 and generate instructions that correspond to a position to which the sensor subsystem is to be moved. Additionally, the sensor position subsystem 104 may store one or more of water temperature, dissolved oxygen, or salinity. In some implementations, the feeding behavior monitoring system 100 is anchored to a structure such as a pier, dock, or buoy instead of being confined within the enclosure 110. For example, instead of being confined within the enclosure 110, the livestock 120 can be free to roam a body of water, and the feeding behavior monitoring system 100 can monitor livestock within a certain area of the body of water.

The sensor position subsystem 104 can generate instructions automatically. That is, the sensor position subsystem 104 does not require a human evaluation or input to determine the suitability of the current position or the next position of the sensor subsystem 102.

The sensor position subsystem 104 can include one or more computers that generate an instruction corresponding to an x, y, and z-coordinate within the enclosure 110. The instruction can also correspond to a rotation about an axis of rotation 112 of the feeding behavior monitoring system 100, the axis of rotation being coextensive with a portion of a cord 114 that extends substantially in the y-direction. Such a rotation changes a horizontal angle of the sensor subsystem 102, the horizontal angle being an angle within the xz-plane at which the sensor subsystem receives sensor input. The instruction can also correspond to a rotation about a pin that connects the sensor subsystem 102 to components of the winch subsystem 108. Such a rotation changes a vertical angle of the sensor subsystem, the vertical angle being measured with respect to the positive y-axis. The instruction can describe a possible position, horizontal angle, and vertical angle of the sensor subsystem 102 within the enclosure 110.

In some implementations, the sensor position subsystem 104 can be communicatively coupled to a computer that can present the sensor data to a caretaker of the aquatic livestock who can observe the livestock and the enclosure 110. The sensor position subsystem 104 can communicate the instruction to the winch subsystem 108.

The sensor position subsystem 104 is communicatively coupled to the feed control subsystem 106. For example, the sensor position subsystem 104 may receive information that indicates a rate that feed is being provided through the feeder 130. In another example, the sensor position subsystem 104 may provide instructions to the feed control subsystem 106 to request that the feed control subsystem 106 control the feeder 130 to start providing feed, stop providing feed, increase a rate that feed is provided, or decrease a rate that feed is provided. The sensor position subsystem 104 may use sensor data to control feeding through the feed control subsystem 106. For example, the feed control subsystem 106 may directly control the feeder 130 and the sensor position subsystem 104 may determine changes to feeding and instruct the feed control subsystem 106 to control the feeder 130 to make those changes.

The sensor position subsystem 104 may position the sensor subsystem 102 to observe feeding behavior based on the feeder 130. The feeder 130 may be one or more of a circular spreader, a linear spreader, or no spreader. A circular spreader may be a rotating spreader that produces a circular distribution of feed, e.g., roughly three to ten meters in diameter (depending on the pressure in the feeding hose and the size of the feed). The sensor position subsystem 104 may position the sensor subsystem 102 so that the winch line is configured to transect the circle so that there are multiple observation points where the camera is close to pellet locations.

A linear spreader may be a raised platform that elevates a feeding hose to spread feed in an ellipse. The sensor position subsystem 104 may position the sensor subsystem 102 closer to the center of the ellipse but generally the position may be less critical given that the feeding zone may be more localized than for a linear spreader.

A no spreader may be similar to the linear spreader without elevation. As a result the feeding zone may be highly localized, e.g., smaller, and there may be significant crowding of fish, sometimes referred to as a vortex, particularly close to the surface. When using a no spread feeder, the sensor subsystem 102 may need to be positioned close to the fish to observe feeding behavior.

In some implementations, when dispersion of feed is not that large, feed may be occluded by fish and the system 100 may rely more on fish behavior as evidence that feeding is occurring. Accordingly, moving closer may not generally be that helpful due to extreme occlusion. Additionally or alternatively, the system 100 may overfeed to find the pellets. If the feed rate is increased sufficiently, the pellets will start to exceed what the fish will eat at the lowest depth that feeding is happening. Either more fish will join lower in the water column or the pellets will fall though. The system 100 may use the overfeeding to both find feed as well as determine a maximum allowable feed rate.

The winch subsystem 108 receives the instructions and activates one or more motors to move the sensor subsystem 102 to the position corresponding to the instructions. The winch subsystem 108 can include one or more motors, one or more power supplies, and one or more pulleys to which the cord 114, which suspends the sensor subsystem 102, is attached. A pulley is a machine used to support movement and direction of a cord, such as cord 114. Although the winch subsystem 108 includes a single cord 114, any configuration of one or more cords and one or more pulleys that allows the sensor subsystem 102 to move and rotate, as described herein, can be used.

The winch subsystem 108 receives an instruction from the sensor position subsystem 104 and activates the one or more motors to move the cord 114. The cord 114, and the attached sensor subsystem 102, can be moved along the x, y, and z-directions, to a position corresponding to the instruction.

A motor of the winch subsystem 108 can be used to rotate the sensor subsystem 102 to adjust the horizontal angle and the vertical angle of the sensor subsystem. A power supply can power the individual components of the winch subsystem. The power supply can provide AC and DC power to each of the components at varying voltage and current levels. In some implementations, the winch subsystem can include multiple winches or multiple motors to allow motion in the x, y, and z-directions.

The sensor subsystem 102 can include one or more sensors that can monitor the livestock. The sensor subsystem 102 may be waterproof and can withstand the effects of external forces, such as typical ocean currents, without breaking. The sensor subsystem 102 can include one or more sensors that acquire sensor data, e.g., images and video footage, thermal imaging, heat signatures, according to the types of sensor of the sensor subsystem. For example, the sensor subsystem 102 can include one or more of the following sensors: a camera, an IR sensor, a UV sensor, a heat sensor, a pressure sensor, a hydrophone, a water current sensor, or a water quality sensor such as one that detects oxygen saturation or an amount of a dissolved solid.

The feeding behavior monitoring system 100 can additionally store the sensor data captured by the sensor subsystem 102 in a sensor data storage. In some implementations, the system 100 can store media, such as video and images, as well as sensor data, such as ultrasound data, thermal data, and pressure data, to name a few examples. Additionally, the sensor data can include GPS information corresponding to a geolocation at which the sensor subsystem captured the sensor data.

One or both of the sensor subsystem 102 and the winch subsystem 108 can include inertial measurement devices for tracking motion and determining position of the sensor subsystem, such as accelerometers, gyroscopes, and magnetometers. The winch subsystem 108 can also keep track of the amount of cord 114 that has been spooled out and reeled in, to provide another input for estimating the position of the sensor subsystem 102. In some implementations the winch subsystem 108 can also provide torques applied to the cord, to provide input on the position and status of the sensor subsystem 102. In some implementations, the sensor subsystem 102 can be attached to an autonomous underwater vehicle (AUV), e.g., a tethered AUV.

In the example of FIG. 1, the sensor subsystem 102 includes a camera which is fully submerged in the enclosure 110, although in other embodiments, the sensor subsystem can acquire sensor data without completely submerging the sensor subsystem, e.g., while the sensor subsystem is suspended above the water. The position of the sensor subsystem 102 within the enclosure 110 is determined by instructions generated by the sensor position subsystem 104.

While various examples are given where sensor position subsystem 104 determines a position to place the sensor subsystem 102 to observe feeding and determines how to control feeding, other implementations are possible. For example, instead of the sensor position subsystem 104, the feed control subsystem 106 may determine how to control feeding. In another example, the sensor subsystem 102 may perform the functionality of both the sensor position subsystem 104 and the feed control subsystem 106.

Figure 2:
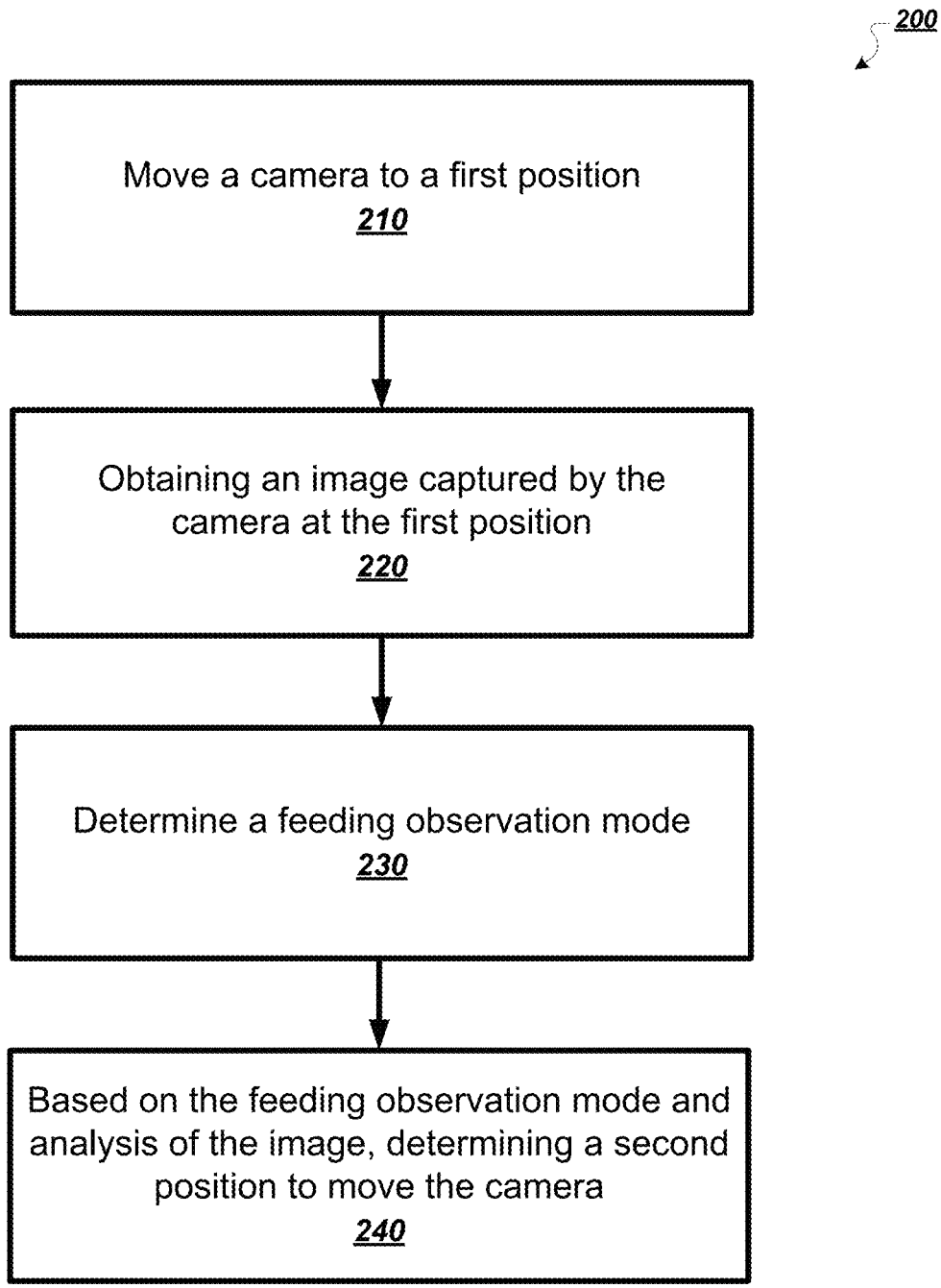
FIG. 2 is a flow diagram for an example process of controlling a camera to observe aquaculture feeding behavior.

FIG. 2 is a flow diagram for an example process 200 for controlling a camera to observe aquaculture feeding behavior. The example process 200 may be performed by various systems, including system 100 of FIG. 1.

The process 200 includes moving a camera to a first position (210). For example, the sensor position subsystem 104 may determine that feed is not visible in an image from the sensor subsystem 102 but a large dense group of fish is visible, reflecting likely feeding, is visible in the distance and, in response, transmits an instruction of "move forward" to the winch subsystem 108.

In another example, the sensor position subsystem 104 may determine that feed is visible but a distance from the sensor subsystem 102 to the feed is more than six feet and, in response, transmit an instruction of "move forward" to the winch subsystem 108. In yet another example, the sensor position subsystem 104 may determine that many close fish are visible and no feed is visible, reflecting that the sensor subsystem 102 is likely surrounded by feeding fish, and, in response, transmit an instruction of "move backwards" to the winch subsystem 108.

The process 200 includes obtaining an image captured by the camera at the first position (220). For example, the sensor subsystem 102 may capture images of the livestock 120 feeding on the feed 132. In another example, the sensor subsystem 102 may capture images of the feed 132 dropping but no livestock 120 feeding on the feed 132. In yet another example, the sensor subsystem 102 may capture images of the livestock 120 feeding on the feed 132 but at a distance more than six feet.

In still yet another example the sensor subsystem 102 may capture images that don't show feed but do show livestock 120 crowded at a location, which indicates that the livestock 120 may be feeding at the location. In a final example, the sensor subsystem 102 may capture images without feed but with many close livestock 120, which indicates that the sensor subsystem 102 may be too close to feeding.

The process 200 includes determining a feeding observation mode. For example, the sensor position subsystem 104 may determine that the system 100 is in a feeder localization mode (230). In another example, the sensor position subsystem 104 may determine that the system 100 is in a patrol mode. In some implementations, the feeder localization mode may occur before the patrol mode, and the patrol mode may only begin after the localization mode is completed. In other implementations, the feeder localization mode and patrol mode may occur concurrently where the position of the camera is continually updated based on both modes. The position of the camera may evolve both over time (e.g. the feeder moves due to line changes or drift from current, wind, waves) or with depth (e.g., due to water current pushing the feed as the feed descends). Accordingly, the feed path may be not be vertical but instead a diagonal line from the up current side at the top to the down current side at the bottom) and the camera tracks the feed path using a top camera and/or bottom camera to determine positions for the camera.

The process 200 includes based on the feeding observation mode and analysis of the image, determining a second position to move the camera (240). For example, the sensor position subsystem 104 may determine to move the sensor subsystem 102 more forward toward the feed 132.

In some implementations, determining a feeding observation mode includes determining that the feeding observation mode corresponds to a feeder localization mode, and determining a second position to move the camera includes (i) determining from the image that fish are likely feeding in a particular direction from the first position and (ii) determining the second position based on the particular direction that the fish are likely feeding. For example, the sensor position subsystem 104 may determine that the feeding observation mode corresponds to a feeder localization, from the image that fish are likely feeding in front of a current position where the image was captured, and determine the second position to be in front of the current position.

In some implementations, during the feeding observation mode, ensuring feeding is occurring may be done by getting a current feeding rate. For example, the sensor position subsystem 104 may obtain a feed rate from the feed control subsystem 106. Ensuring feeding may be complicated by the fact that there may be a lag between when feed is being released and when it is delivered. For example, feed may be stored half a mile from the enclosure 110 so may take some time to arrive at the enclosure 110.

Additionally, at some sites feeders may share feeding hoses so feed may be delivered by the feeder 130 in a duty cycle fashion. For example, the feeder 130 may provide feed for one minute every three minutes. Feeding perception signals may be clearest when fish are most hungry. Accordingly, the sensor position subsystem 104 may position the sensor subsystem 102 to observe feeding at the start of feeding, e.g., a few minutes after feeding has begun.

In some implementations, determining from the image that fish are likely feeding in a particular direction from the first position includes determining from the image that at a location one or more of a density of fish satisfies a density criteria, a horizontal swimming speed of fish satisfies a speed criteria, a number of fish swimming vertical satisfies a vertical criteria, a number of mouths of fish opening satisfies a mouth criteria, or a number of feed satisfies a feed criteria, and determining the particular direction based on the location.

For example, the sensor position subsystem 104 may determine that at a location in front of the sensor subsystem 102 one or more of: a density criteria of fish is more than one fish per cubic foot, a horizontal swimming speed of fish satisfies a speed criteria of an average of ten miles per hour, a number of fish swimming vertical satisfies a vertical criteria of two fish per second, a number of mouths of fish opening satisfies a mouth criteria of three fish per second, or a number of feed satisfies a feed criteria of three pellets per second, and, in response, determine the particular direction is in front.

In some implementations, determining that the feeding observation mode corresponds to a feeder localization mode includes determining that a feeding process has started. For example, the sensor position subsystem 104 may determine that the feed control subsystem 106 has just started providing feed and, in response, determine the feeding observation mode is a feeder localization mode.

In some implementations, determining a feeding observation mode includes determining that the feeding observation mode corresponds to patrol mode and determining a second position to move the camera includes determining from the image that feed is sinking below the first position and determining the second position to be deeper than the first position. For example, the sensor position subsystem 104 may determine that feed is sinking below a view of the sensor subsystem 102 and, in response, determine to position the sensor subsystem 102 four, six, eight feet, or some other distance deeper.

In some implementations, determining from the image that feed is sinking below the first position includes determining that feed is visible at the bottom of the image. For example, the sensor position subsystem 104 may detect feed near a bottom fifth of the image and, in response, determine that feed is sinking below the first position.

In some implementations, determining a feeding observation mode includes determining that the feeding observation mode corresponds to patrol mode and determining a second position to move the camera includes determining from the image that feed is not visible and determining the second position to be shallower than the first position. For example, the sensor position subsystem 104 may determine that feed is not visible in an image so all the feed may be being consumed above the position of the sensor subsystem 102 and, in response, determine the second position to be eight feet above a current position.

In some implementations, determining a feeding observation mode includes determining that the feeding observation mode corresponds to patrol mode and determining a second position to move the camera includes determining from the image that feed is visible but not sinking below the first position, increasing an amount of feed provided to the fish, and determining the second position to be deeper than the first position. For example, the sensor position subsystem 104 may determine that all feed is being consumed in a current view and that a rate that feed is provided may be increased and, in response, increase a rate of feed being provided and reposition the sensor subsystem 102 deeper to observe whether the feed is sinking and not being consumed.

In some implementations, the process 200 includes obtaining a second image captured by the camera at the second position, determining the feed is sinking below the second position, and reducing the amount of feed provided to the fish. For example, the sensor position subsystem 104 may determine from images that feed is sinking below a second position so is not being consumed and, in response, instruct the feed control subsystem 106 to reduce a rate that feed is provided to the fish.

In some implementations, determining that the feeding observation mode corresponds to patrol mode includes determining that the feeder localization mode has completed. For example, the sensor position subsystem 104 may enter the patrol mode once the feeder localization mode has ended when the sensor subsystem 102 has a feeding zone centered and feed is visible.

Figure 3A:
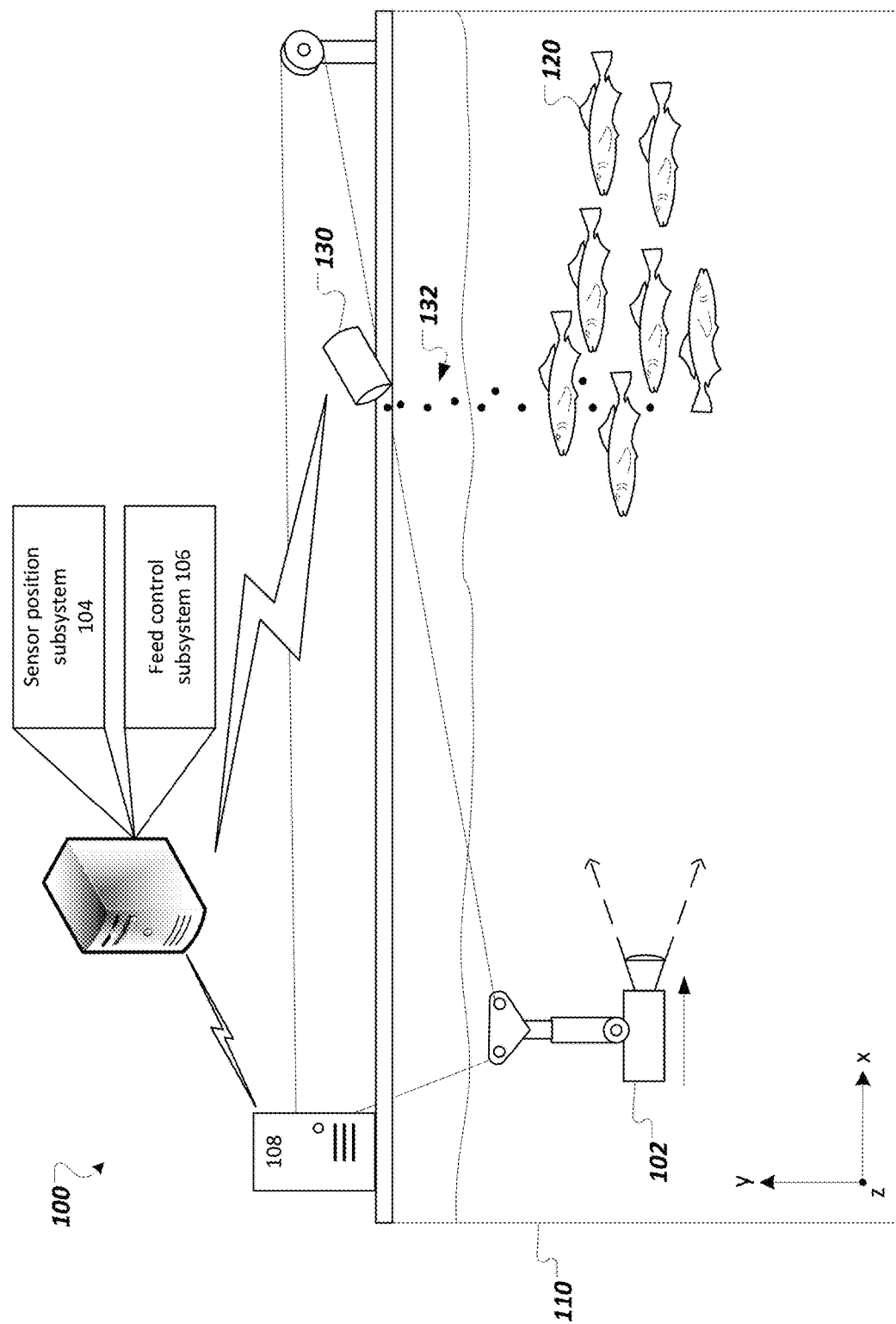
FIG. 3A is a diagram that illustrates a position change of the camera with a horizontal view.

FIG. 3A is a diagram that illustrates a position change of the camera with a horizontal view. As shown, the sensor subsystem 102 includes a camera with a view pointing to the right and the sensor position subsystem 104 instructs the winch subsystem 108 to move the sensor subsystem 102 horizontally towards the livestock 120.

In some implementations, during a feeder localization mode the sensor subsystem 102 may initially be positioned starting at a shallow depth, e.g., two meters or less, at one extreme side of the enclosure 110 and be moved horizontally across the enclosure 110 until feeding is detected. For example, the sensor position subsystem 104 may initially look for high fish density as that can be seen from far away and indicate a feeding zone is being approached, then look for an average horizontal swimming speed of the fish correlating with feeding, then look for vertically swimming fish as those fish may be swimming upwards to intercept feeding pellets as they fall, then look for fish mouth opening, and then finally look for feed pellets.

Once the feed is detected, the sensor position subsystem 104 may move the sensor subsystem 102 to maximize an amount of feed seen per second. Additionally, the sensor position subsystem 104 may adjust a pan angle of the sensor subsystem 102 to center feeding in a view of the sensor subsystem 102. Adjusting a pan angle may occur continuously while feeding is being observed.

In some implementations, due to currents, movement of the feeder, changes in blower pressure, or general changes in sea state, the feeding zone may move over time so the sensor position subsystem 104 may reposition the sensor subsystem 102 from time to time. Repositioning may follow the same process as initially positioning the sensor subsystem 102, but may also assume a position is generally correct and only use horizontal and pan movement to at least one of increase an amount of feed seen or center feeding activity.

In some implementations, the system 100 may use a feeder localization mode that locates a feeding zone based on measuring a distribution of feed detection events as the sensor subsystem 102 moves. The sensor subsystem 102 may be moved to transect the enclosure 110, e.g., move from one side to the other at a depth of three to six meters, to locate the feeding zone. Because the feeder 130 may deliver feed non-uniformly, e.g., due to clogs, time sharing of feeding hoses, etc., it may be necessary for the sensor position subsystem 104 to move the sensor subsystem 102 slowly and make multiple passes back and forth.

The sensor position subsystem 104 may move the sensor subsystem 102 consistently and measure the exposure time (e.g., in camera frames/unit distance). For example, if the sensor subsystem 102 takes twice as long in one spot, then the sensor position subsystem 104 may expect to see twice the number of feed detections at the spot.

As a result of moving the sensor subsystem 102, the system 100 may obtain a probability distribution that may be used to find a largest peak, where the location of the largest peak corresponds to an optimal initial position of the sensor subsystem 102 to observe feeding behavior. Once in the location that corresponds to the largest peak, the pan angle may be adjusted to maximize the number of feed seen. For example, in a two camera system, the pan angle may be adjusted so that the amount of feed seen in a side camera may be maximized while a top camera is used in conjunction to make sure feed is visible.

As the feeding process progresses, both the side stereo camera and the top camera may be used in conjunction to make sure the camera stays in the feeding zone. If no feed is seen for some threshold time while the feeder 130 is running (e.g., based on connection to the feed control subsystem 106) then a calibration mode may be started, where the calibration mode is similar to the feeder localization mode but the camera is moved to transect for a shorter horizontal distance (e.g., +/−five meters). If no feed is found by the sensor position subsystem 104 during the calibration mode but the feeder 130 is running, then that may indicate the feeding hose is blocked and the sensor position subsystem 104 may raise an exception that the feeding hose is blocked.

Figure 3B:
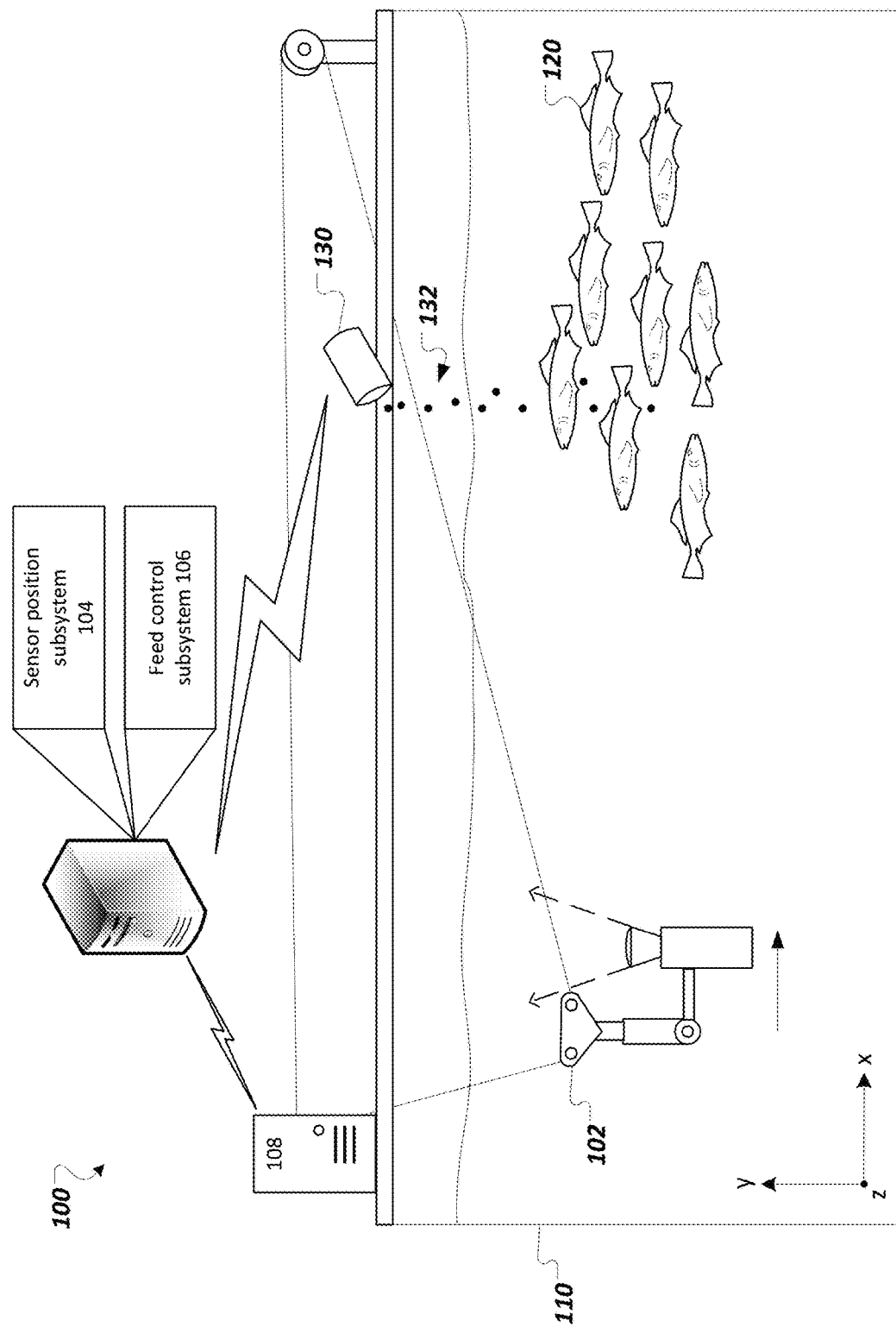
FIG. 3B is a diagram that illustrates a position change of the camera with an upwards view.

FIG. 3B is a diagram that illustrates a position change of the camera with an upwards view. As shown, the sensor subsystem 102 includes a camera with a view pointing upwards and the sensor position subsystem 104 instructs the winch subsystem 108 to move the sensor subsystem 102 to the right towards the livestock 120. The camera with a view pointing upwards may be positioned in an approach similar to the approach described above for the camera with a horizontal view.

Figure 4:
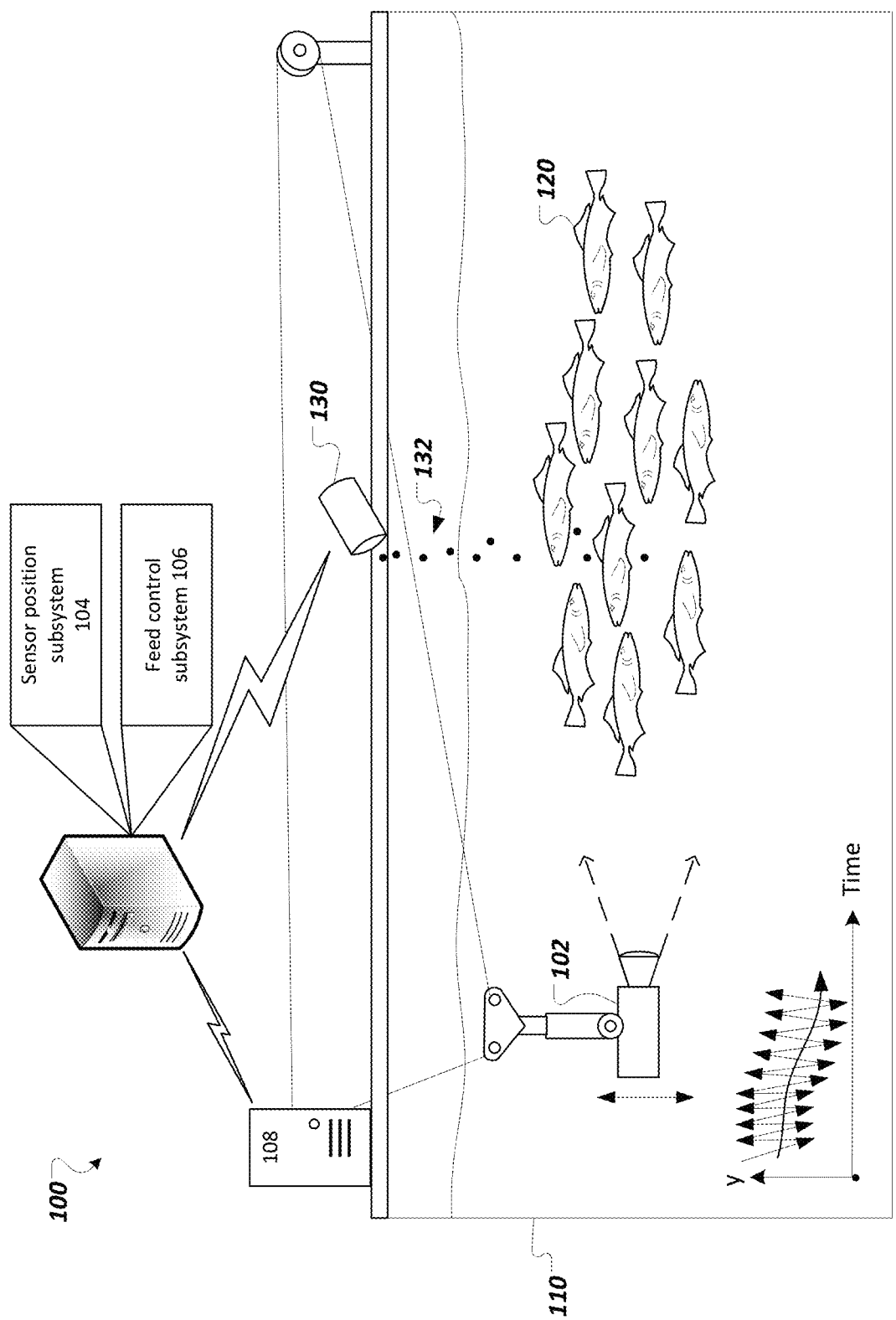
FIG. 4 is a diagram that illustrates changes in depth of a camera during feeding.

FIG. 4 is a diagram that illustrates changes in depth of a camera during feeding. In some implementations, the sensor subsystem 102 may be moved to scan vertically through the water column to produce a map over time of different depths and feeding behavior at those positions. There are several strategies for moving the sensor subsystem 102.

One approach may be to scan a full depth, e.g., from six meters to sixty meters, of the water column each time. However, a disadvantage may be that the sensor subsystem may need to move slowly to not affect the behavior of the fish so each scan from top to bottom may take a considerable amount of time. Scanning a full depth may take longer to update activity as observations may be temporal as well as spatial, so focusing on critical areas may enable higher frequency of updates.

FIG. 4 illustrates another approach of using feeding behavior, e.g. the presence/absence of pellets and fish, to control the range that the sensor subsystem 102 travels during feeding. This approach may permit higher frequency scanning of relevant parts of the water column. For example, the sensor position subsystem 104 may continuously scan from a depth just before when feeding begins to a depth just after where feeding ends.

The graph in the lower left of FIG. 4 shows how the depth of the sensor subsystem 102 changes across time corresponding to a depth that feed is being consumed. The arrows going up and down reflect the depth of the sensor subsystem 102 and the arrow travelling across the up and down arrows reflects depths that feed is finished being consumed. As shown in FIG. 4, the depth of feeding increases as the fish get full and stop feeding as quickly.

Another approach is using uncertainty in an internal model to target specific parts of the water column to collect data, e.g. areas with low fish density maybe less relevant that areas with high fish density, and the region at the bottom of the feeding zone may be more critical to observe than the top of the water column. In still another approach, the system 100 may keep a model describing both feeding activity level and uncertainty on feeding. An update model similar to a Kalman filter may be used to incorporate domain knowledge, such as typical changes in fish behavior over the feeding period, and observed feeding. This combined model may be tolerant to intermittent degradation in the quality of observed feeding, which may be caused, for example, by fish getting scared of passing boats. An algorithm for sensor subsystem 102 positioning may use the combined model so as to reduce uncertainty of the current feeding depth.

Figure 5:
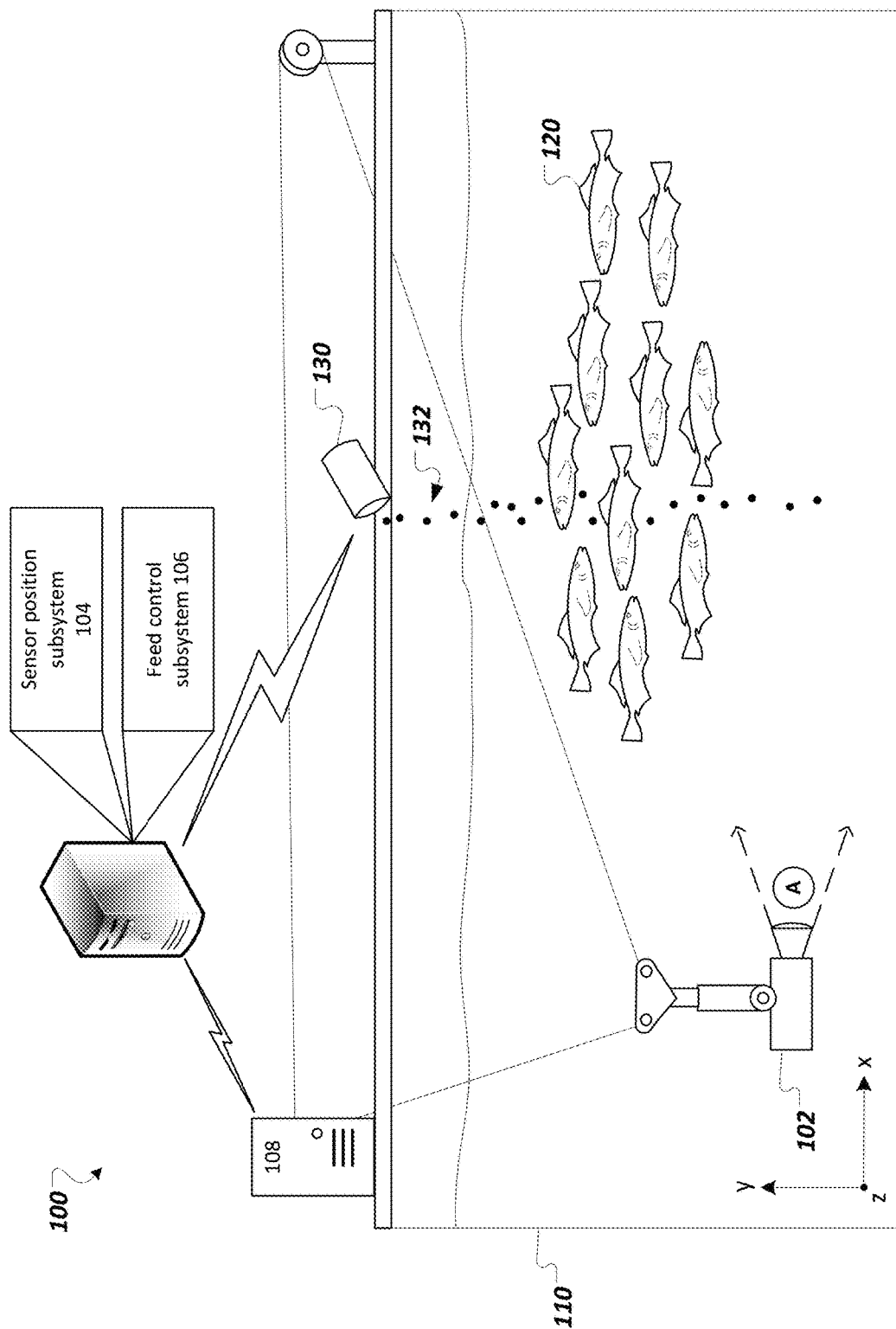
FIG. 5 is a diagram that illustrates observation of overfeeding.

FIG. 5 is a diagram that shows observation of overfeeding. For example, the sensor subsystem 102 may capture images of the feed sinking below a bottom of the enclosure 110 at a sixty foot depth. In some implementations, the system 100 may determine a maximal feeding rate by observing overfeeding. For example, the system 100 may determine that fish aren't being overfeed so may increase a rate that feed is provided until the fish are being overfeed.

In more detail, to determine a maximal amount of feed that the fish can consume at any point in time, the system 100 may feed beyond the maximal amount and then decrease until feed is no longer unconsumed. A maximal feed acceptance rate may be coupled with a feeding strategy, e.g., e.g. feed rate 90% of a maximal rate. Determining a maximal feed acceptance rate may be done by raising the feed rate by some amount, e.g., 5%, 10%, 20%, or some other amount, and positioning the sensor subsystem 102 six to nine feet below a lowest point where feeding is observed. If the fish consume all or most of the feed at the new feeding rate, the feeding zone will likely move downwards but all the feed will be observed to be eaten.

Conversely, if the feeding amount is too high, the feed will be unconsumed and may fall through to the bottom of the enclosure 110. If feed is not all consumed, then the sensor position subsystem 104 may slowly decrease a feed rate until feed is no longer being unconsumed. Given there are a large set of fish with complex system dynamics, observations may need to be made over sufficient time, e.g., tens of minutes, to allow the system 100 to adapt to changes.

The system 100 may similarly be used to detect an end of feeding. A termination of a feeding process may be when pellets are not being consumed and consumption occurring is insufficient to warrant wasting feeding. For example, the sensor position subsystem 104 may determine that during a past minute, less than thirty pellets were consumed and half of the feed provided was unconsumed and, in response, end the feeding.

The criteria for terminating feeding may depend on an optimization of various metrics including, but not limited to, a biological feed conversion ratio (e.g., increase in biomass), relative growth index, economic feed conversion ratio (e.g., increase in biomass including mortalities), environmental factors (e.g., dissolved oxygen/temperature), and expected appetite based on prior days feeding. The sensor position subsystem 104 may calibrate the criteria based on optimization of these factors with A/B experimentation.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   moving a camera to a first position;
   obtaining one or more images captured by the camera at the first position;
   determining, from the one or more images, a first value representing a speed of one or more fish within an enclosure;
   determining, from the one or more images, a second value representing a number of open mouths of fish;
   determining, based on the first value representing the speed of the one or more fish within the enclosure and the second value representing the number of open mouths of fish, that the one or more fish are likely feeding; and
   determining a second position within the enclosure to move the camera based on determining that the one or more fish are likely feeding.

2. The method of claim 1, wherein determining, based on the first value representing the speed of the one or more fish within the enclosure and the second value representing the number of open mouths of fish, that the one or more fish are likely feeding comprises:
    determining from the one or more images that at a location two or more of:
        a density of fish satisfies a density criteria;
        a horizontal swimming speed of fish satisfies a speed criteria;
        a number of fish swimming vertical satisfies a vertical criteria;
        a number of open mouths of fish satisfies a mouth criteria; or
        a number of feed satisfies a feed criteria.

3. The method of claim 2, wherein determining, based on the first value representing the speed of the one or more fish within the enclosure and the second value representing the number of open mouths of fish, that the one or more fish are likely feeding comprises:
    determining that an average horizontal swimming speeds of the fish shown in the one or more images satisfies the speed criteria, wherein the speed criteria correlates with feeding.

4. The method of claim 1, comprising:
    obtaining a second image captured by the camera at the second position;
    determining, from the second image, that a number of fish swimming vertical satisfies a vertical criteria; and
    determining a third position within the enclosure to move the camera.

5. A computer-readable storage device encoded with a computer program, the program comprising instructions that when executed by one or more computers cause the one or more computers to perform operations comprising:
    moving a camera to a first position;
    obtaining one or more images captured by the camera at the first position;
    determining, from the one or more images, a first value representing a speed of one or more fish within an enclosure;
    determining, from the one or more images, a second value representing a number of open mouths of fish;
    determining, based on the first value representing the speed of the one or more fish within the enclosure and the second value representing the number of open mouths of fish, that the one or more fish are likely feeding; and
    determining a second position within the enclosure to move the camera based on determining that the one or more fish are likely feeding.

6. The device of claim 5, wherein determining, based on the first value representing the speed of the one or more fish within the enclosure and the second value representing the number of open mouths of fish, that the one or more fish are likely feeding comprises:
    determining from the one or more images that at a location one or more of:
        a density of fish satisfies a density criteria;
        a horizontal swimming speed of fish satisfies a speed criteria;
        a number of fish swimming vertical satisfies a vertical criteria;
        a number of open mouths of fish satisfies a mouth criteria; or
        a number of feed satisfies a feed criteria.

7. The device of claim 6, wherein determining, based on the first value representing the speed of the one or more fish within the enclosure and the second value representing the number of open mouths of fish, that the one or more fish are likely feeding comprises:
    determining that an average horizontal swimming speeds of the fish shown in the one or more images satisfies the speed criteria, wherein the speed criteria correlates with feeding.

8. The device of claim 5, the operations comprising:
    obtaining a second image captured by the camera at the second position;
    determining, from the second image, that a number of fish swimming vertical satisfies a vertical criteria; and
    determining a third position within the enclosure to move the camera.

9. A system comprising:
    one or more computers and one or more storage devices storing instructions that are operable, when executed by the one or more computers, to cause the one or more computers to perform operations comprising:
        moving a camera to a first position;
        obtaining one or more images captured by the camera at the first position;
        determining, from the one or more images, a first value representing a speed of one or more fish within an enclosure;
        determining, from the one or more images, a second value representing a number of open mouths of fish;
        determining, based on the first value representing the speed of the one or more fish within the enclosure and the second value representing the number of open mouths of fish, that the one or more fish are likely feeding; and
        determining a second position within the enclosure to move the camera based on determining that the one or more fish are likely feeding.

10. The system of claim 9, wherein determining, based on the first value representing the speed of the one or more fish within the enclosure and the second value representing the number of open mouths of fish, that the one or more fish are likely feeding comprises:
    determining from the one or more images that at a location two or more of:
        a density of fish satisfies a density criteria;
        a horizontal swimming speed of fish satisfies a speed criteria;
        a number of fish swimming vertical satisfies a vertical criteria;
        a number of open mouths of fish satisfies a mouth criteria; or
        a number of feed satisfies a feed criteria.

11. The system of claim 10, wherein determining, based on the first value representing the speed of the one or more fish within the enclosure and the second value representing the number of open mouths of fish, that the one or more fish are likely feeding comprises:
    determining that an average horizontal swimming speeds of the fish shown in the one or more images satisfies the speed criteria, wherein the speed criteria correlates with feeding.

12. The system of claim 9, the operations comprising:
    obtaining a second image captured by the camera at the second position;
    determining, from the second image, that a number of fish swimming vertical satisfies a vertical criteria; and determining a third position within the enclosure to move the camera.

\* \* \* \* \*